(12) United States Patent
Utsunomiya et al.

(10) Patent No.: US 12,415,534 B2
(45) Date of Patent: Sep. 16, 2025

(54) VEHICLE SYSTEM AND STORAGE MEDIUM

(71) Applicant: DENSO CORPORATION, Kariya (JP)

(72) Inventors: Masato Utsunomiya, Kariya (JP); Asaki Umezawa, Kariya (JP); Kazuki Izumi, Kariya (JP)

(73) Assignee: DENSO CORPORATION, Kariya (JP)

( * ) Notice: Subject to any disclaimer, the term of this patent is extended or adjusted under 35 U.S.C. 154(b) by 17 days.

(21) Appl. No.: 18/421,388

(22) Filed: Jan. 24, 2024

(65) Prior Publication Data

US 2024/0157961 A1 May 16, 2024

Related U.S. Application Data

(63) Continuation of application No. PCT/JP2022/026595, filed on Jul. 4, 2022.

(30) Foreign Application Priority Data

Aug. 4, 2021 (JP) .................................. 2021-128410

(51) Int. Cl.
*B60W 50/14* (2020.01)
*B60W 40/08* (2012.01)
(Continued)

(52) U.S. Cl.
CPC ............ *B60W 50/14* (2013.01); *B60W 40/08* (2013.01); *G01C 21/3841* (2020.08); *G01C 21/387* (2020.08); *G06V 20/56* (2022.01); *G06V 20/597* (2022.01); *B60W 2050/143* (2013.01); *B60W 2050/146* (2013.01); *B60W 2420/403* (2013.01);
(Continued)

(58) Field of Classification Search
CPC .................................................... B60W 50/14
See application file for complete search history.

(56) References Cited

U.S. PATENT DOCUMENTS 11,913,802 B2 * 2/2024 Kim ...................... G01S 13/867
12,292,303 B2 * 5/2025 Miksa .................... G01C 21/32
(Continued)

FOREIGN PATENT DOCUMENTS

DE 102012218361 A1 * 10/2013 ............ B60W 30/09
JP 2015108926 A 6/2015
(Continued)

*Primary Examiner* — Brian A Zimmerman
(74) *Attorney, Agent, or Firm* — Harness, Dickey & Pierce, P.L.C.

(57) ABSTRACT

A vehicle system: estimates a position of a host vehicle; acquires, from outside of the host vehicle, a probe data map generated based on probe data; recognizes periphery information indicating a periphery of the host vehicle using a detection result of an autonomous sensor; specifies an attention point using the probe data map; recognizes a driver status; compares feature information indicated by the probe data map with the periphery information of the host vehicle and determines whether the probe data map has a high quality or a low quality; determines, based on the driver status, whether the driver performs a safety confirmation for the attention point indicated by the probe data map when the probe data map is determined to have the high quality; and notifies the driver of a determination result of the safety confirmation.

14 Claims, 8 Drawing Sheets

(51) Int. Cl.
   *G01C 21/00*   (2006.01)
   *G06V 20/56*   (2022.01)
   *G06V 20/59*   (2022.01)

(52) U.S. Cl.
   CPC ... *B60W 2540/229* (2020.02); *B60W 2556/25* (2020.02); *B60W 2556/40* (2020.02); *B60W 2556/45* (2020.02)

(56) References Cited

U.S. PATENT DOCUMENTS

| | | | |
|---|---|---|---|
| 2019/0323855 A1* | 10/2019 | Mahler | G01S 17/931 |
| 2020/0184500 A1* | 6/2020 | Yuyama | B60W 40/09 |
| 2022/0215673 A1 | 7/2022 | Fujiwara et al. | |
| 2023/0150531 A1* | 5/2023 | Park | B60W 50/082 |
| | | | 701/23 |
| 2023/0256992 A1* | 8/2023 | Terazawa | G16Y 40/20 |
| | | | 701/23 |
| 2023/0349716 A1* | 11/2023 | Wang | G06N 3/0464 |
| 2023/0391358 A1* | 12/2023 | Donderici | G06V 20/584 |
| 2025/0115656 A1* | 4/2025 | Deisseroth | C12N 15/86 |
| 2025/0118084 A1* | 4/2025 | Lukarski | G06V 10/764 |

FOREIGN PATENT DOCUMENTS

| | | | | | |
|---|---|---|---|---|---|
| JP | 2020095403 | A | | 6/2020 | |
| JP | 2021056608 | A | | 4/2021 | |
| JP | 2023023152 | A | * | 2/2023 | ............ B60W 40/08 |
| JP | 7530694 | B2 | * | 8/2024 | ............ B60K 35/00 |

\* cited by examiner

VEHICLE SYSTEM AND STORAGE MEDIUM

CROSS REFERENCE TO RELATED APPLICATIONS

The present application is a continuation application of International Patent Application No. PCT/JP2022/026595 filed on Jul. 4, 2022, which designated the U.S. and claims the benefit of priority from Japanese Patent Application No. 2021-128410 filed on Aug. 4, 2021. The entire disclosures of all of the above applications are incorporated herein by reference.

TECHNICAL FIELD

The present disclosure relates to a vehicle system and a storage medium storing a driving diagnosis program.

BACKGROUND

In a related art, a vehicle system transmits, to a driving diagnosis server, driving state information indicating a state of vehicle being driven by a driver. Then, the driving diagnosis server performs a driving diagnosis based on the driving state information transmitted from the vehicle system.

SUMMARY

The present disclosure provides a vehicle system. The vehicle system: estimates a position of a host vehicle; acquires, from outside of the host vehicle, a probe data map generated based on probe data; recognizes periphery information indicating a periphery of the host vehicle using a detection result of an autonomous sensor that detects the periphery information of the host vehicle; specifies an attention point using the probe data map; recognizes a status of a driver of the host vehicle; compares feature information indicated by the probe data map with the periphery information of the host vehicle indicated by the detection result of the autonomous sensor and determines whether the probe data map has a high quality or a low quality; determines, based on the status of the driver, whether the driver performs a safety confirmation for the attention point indicated by the probe data map when the probe data map is determined to have the high quality; and notifies the driver of a determination result indicating whether the driver has performed the safety confirmation.

BRIEF DESCRIPTION OF DRAWINGS

Objects, features and advantages of the present disclosure will become apparent from the following detailed description made with reference to the accompanying drawings. In the drawings.

DETAILED DESCRIPTION

Conventionally, driving diagnosis is performed based on a behavior of host vehicle, such as an accelerator operation, a brake operation, or a vehicle speed. However, there are various traveling environments around the host vehicle, such as presence or absence of pedestrians, bicycles, and oncoming vehicles. Thus, when the driving diagnosis is performed based only on the behavior of host vehicle, a proper driving diagnosis result may not be obtained. In a case where a proper driving diagnosis result cannot be obtained, the driver may fail to receive a sense of safety and security from the vehicle.

According to an aspect of the present disclosure, a vehicle system includes: a vehicle position estimation unit estimating a position of a host vehicle; a probe data map acquiring unit acquiring, from outside of the host vehicle, a probe data map generated based on probe data; an autonomous sensor detecting periphery information indicating a periphery of the host vehicle; a vehicle periphery recognition unit recognizing the periphery information indicating the periphery of the host vehicle using a detection result of the autonomous sensor; an attention point specifying unit specifying an attention point using the probe data map; a driver status recognition unit recognizing a status of a driver of the host vehicle; a map quality determination unit comparing feature information indicated by the probe data map with the periphery information of the host vehicle indicated by the detection result of the autonomous sensor and determines whether the probe data map has a high quality or a low quality; a safety confirmation determination unit determining, based on the status of the driver, whether the driver performs a safety confirmation for the attention point indicated by the probe data map when the probe data map is determined to have the high quality; and a notification control unit notifying the driver of a determination result of the safety confirmation determination unit.

Unlike the related art in which driving diagnosis is performed only based on the behavior of host vehicle, in the above-described vehicle system, the attention point is specified using the probe data map. Then, the vehicle system determines whether the driver performs safety confirmation about the attention point based on the driver status, and the determination result is notified to the driver. When the driver does not perform the safety confirmation about the attention point, the driver is notified of the necessity of safety confirmation so that the driver can perform the safety confirmation. When the driver performs the safety confirmation about the attention point, the driver is notified of the execution of safety confirmation so that a sense of safety and security from the vehicle can be appropriately notified to the driver.

Figure 1:
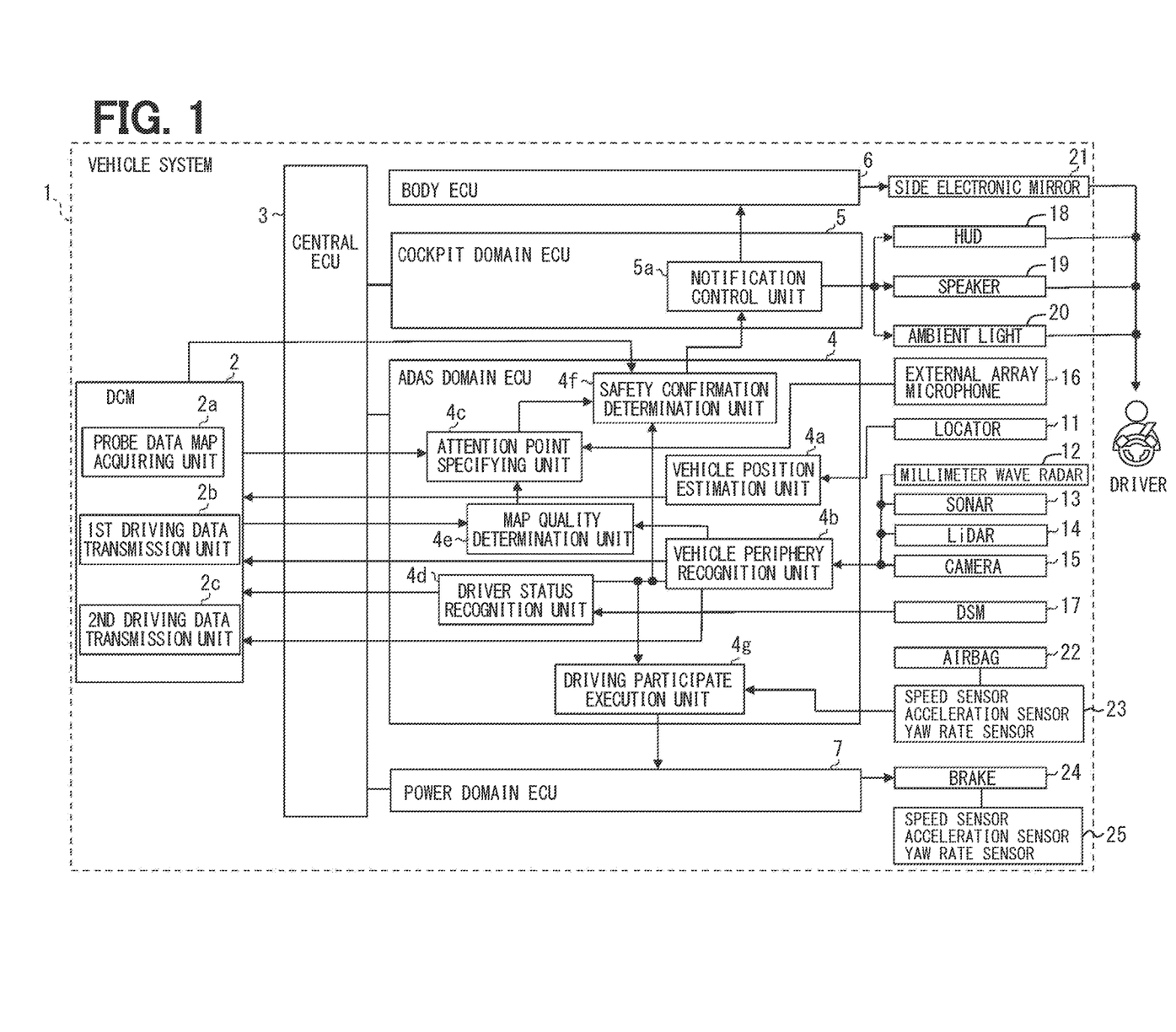
FIG. 1 is a block diagram showing a configuration of vehicle system according to an embodiment of the present disclosure.

The following will describe an embodiment of the present disclosure with reference to the accompanying drawings. As shown in FIG. 1, a vehicle system 1 is mounted on a vehicle, and includes a data communication module (hereinafter, referred to as DCM) 2, a central electronic control unit (ECU) 3, an advanced driver assistance system (ADAS) domain ECU 4, a cockpit domain ECU 5, a body ECU 6, and a powertrain domain ECU 7.

Each of the DCM 2 and the ECUs 3 to 7 includes a microcomputer having a central processing unit (CPU), a read only memory (ROM), a random access memory (RAM), and an input/output (I/O). Each microcomputer executes a computer program stored in a non-transitory tangible storage medium to execute a process corresponding to the computer program. The microcomputers control overall operations of the DCM 2 and the ECUs 3 to 7, respectively. The microcomputer is also known as a processor. The non-transitory tangible storage media may share its hardware with another computer resource. The DCM 2 and the ECUs 3 to 7 cooperate with one another to control an overall operation of the vehicle system 1.

Figure 2:
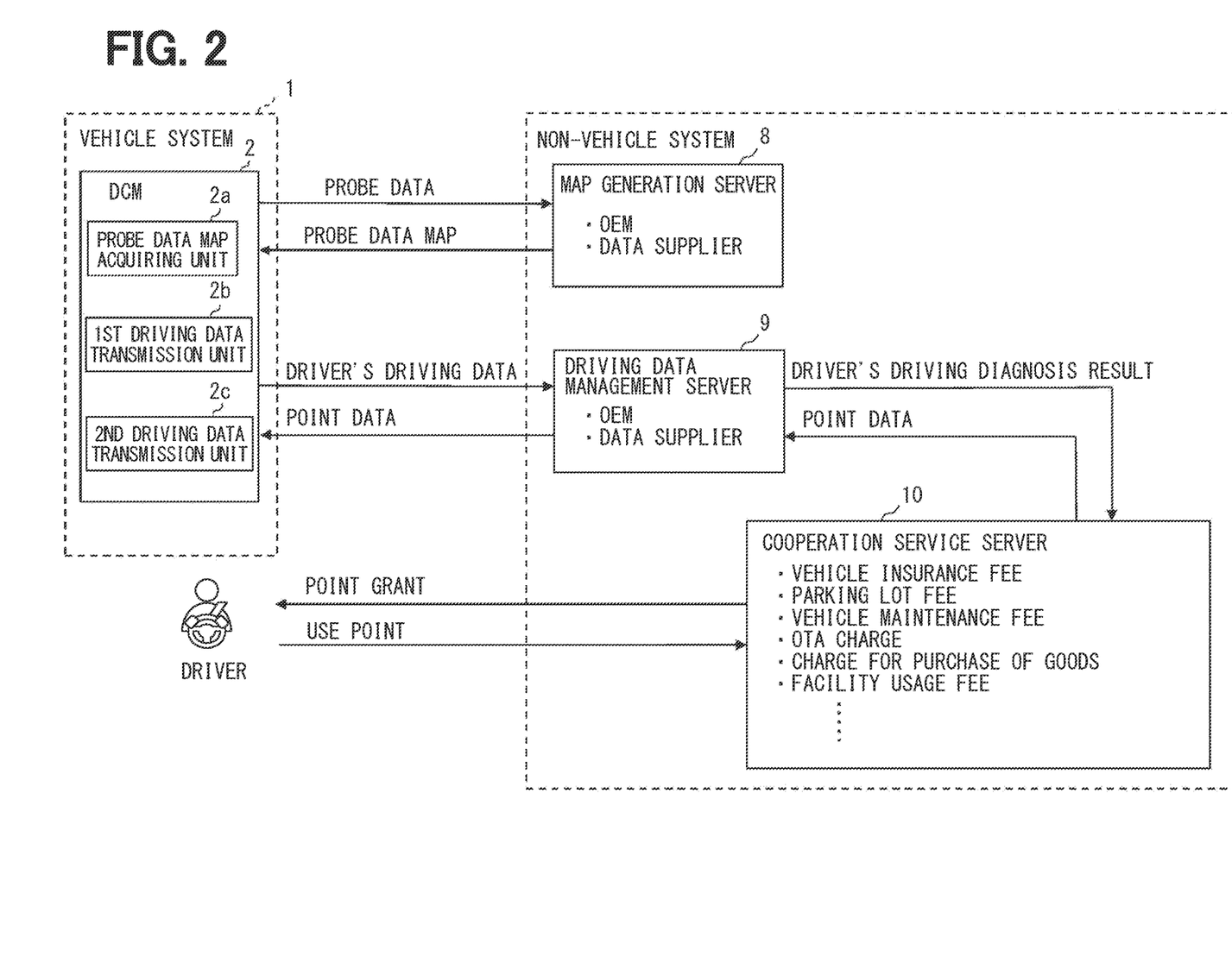
FIG. 2 is a block diagram showing an overall configuration including a non-vehicle system.

As illustrated in FIG. 2, the vehicle system 1 is connected to a map generation server 8 and a driving data management server 9 via a communication network such that the vehicle system 1 can perform data communication with an external source. For example, the communication network may include a digital communication line. The map generation server 8 may be managed by an original equipment manufacturing (OEM), a data supplier, or the like. The map generation server integrates multiple records of probe data to generate a probe data map. The driving data management server 9 may be managed by an OEM, a data supplier, or the like, and manages driver's driving data. The driving data management server 9 may be connected to a cooperation service server 10 via a communication network such that the driving data management server 9 can perform data communication with the cooperation service server 10. The cooperation service server 10 manages points to be given to the driver. The points given to the driver can be used in various payments, such as an insurance fee of vehicle insurance, a usage fee of parking lot, a maintenance fee of vehicle, an over the air (OTA) charge, charge for purchase of goods, and a usage fee of facility such as a movie theater or a restaurant.

The vehicle system 1 has a multiple-to-one relationship with the map generation server 8 and the driving data management server 9. That is, multiple vehicle systems 1 mounted in multiple vehicles are connected to one map generation server 8 so as to be able to perform data communication, and multiple vehicle systems 1 mounted in multiple vehicles are connected to one driving data management server 9 so as to be able to perform data communication.

The DCM 2 has a vehicle-to-everything (V2X) communication function as a vehicle communication device, and performs a vehicle communication control in data communication with an infrastructure equipment that includes the map generation server 8 and the driving data management server 9. The DCM 2 includes a probe data map acquiring unit 2a, a first driving data transmission unit 2b, and a second driving data transmission unit 2c.

The central ECU 3 integrally manages the ADAS domain ECU 4, the cockpit domain ECU 5, and the powertrain domain ECU 7. The ADAS domain ECU 4 includes a vehicle position estimation unit 4a, a vehicle periphery recognition unit 4b, an attention point specifying unit 4c, a driver status recognition unit 4d, a map quality determination unit 4e, a safety confirmation determination unit 4f, and a driving participate execution unit 4g. The cockpit domain ECU 5 includes a notification control unit 5a.

The locator 11 calculates position coordinates using various parameters included in satellite signals transmitted from global navigation satellite system (GNSS), corrects the calculated position coordinates using detection results of a gyro sensor, a vehicle speed sensor, and the like. Then, the locator 11 outputs the corrected position coordinates to the vehicle position estimation unit 4a. The GNSS is a general term for global navigation satellite system, and includes various systems such as GPS (Global Positioning System), GLONASS (Global Navigation Satellite System), Galileo, BeiDou, and IRNSS (Indian Regional Navigational Satellite System). When the position coordinates are input from the locator 11, the vehicle position estimation unit 4a estimates the position of host vehicle using the input position coordinates, and outputs the estimated vehicle position to the DCM 2.

A millimeter wave radar 12 emits millimeter waves toward periphery of the host vehicle to sense a periphery of the host vehicle, and outputs the detection result to the vehicle periphery recognition unit 4b. The millimeter wave radar 12 has advantages of high straightness, miniaturization of circuit and antenna design, high distance resolution and high angular resolution by using wide range bandwidth, and resistance to environmental changes such as weather. A sonar 13 emits, for example, ultrasonic waves to the periphery of host vehicle to sense the periphery of host vehicle, and outputs the detection result to the vehicle periphery recognition unit 4b. The sonar 13 has an advantage of reflecting light on a glass surface or a water surface. A LiDAR (Light Detection and Ranging) 14 emits laser lights toward the periphery of host vehicle to sense the periphery of the host vehicle, and outputs the detection result to the vehicle periphery recognition unit 4b. The LiDAR 14 has an advantage of reflecting light on a non-metal surface, and can be detected even at night or in rainfall. A camera 15 includes an image sensor such as a charge coupled device (CCD) or a complementary metal oxide semiconductor (CMOS). The camera 15 captures an image of the periphery of host vehicle, and outputs the captured camera image to the vehicle periphery recognition unit 4b. The millimeter wave radar 12, the sonar 13, the LiDAR 14, and the camera 15 correspond to autonomous sensors. It is not necessary to provide all of the millimeter wave radar 12, the sonar 13, the LiDAR 14, and the camera 15 to the host vehicle. At least one of these autonomous sensors may be provided to the host vehicle. For example, a different type of autonomous sensor may be provided separately from the millimeter wave radar 12, the sonar 13, the LiDAR 14, and the camera 15.

When the detection result is input from the millimeter wave radar 12, the detection result is input from the sonar 13, the detection result is input from the LiDAR 14, or the camera image is input from the camera 15, the vehicle periphery recognition unit 4b recognizes the periphery of host vehicle using the input detection result and camera image, and outputs the recognized periphery information indicating the periphery of host vehicle to the DCM 2, the map quality determination unit 4e, the safety confirmation determination unit 4f, and the driving participate execution unit 4g. The periphery information includes, as static information, feature information such as positions and types of marking lines, stop lines, crosswalks, and the like painted on a road surface, positions and types of traffic lights, road signs, and the like erected from the road surface, road widths, road types, the number of lanes, and the like. The periphery information includes, as dynamic static information, positions of pedestrians, bicycles, and oncoming vehicles.

When the host vehicle position is input from the vehicle position estimation unit 4a and the periphery information indicating the periphery of host vehicle is input from the vehicle periphery recognition unit 4b, the DCM 2 transmits probe data to the map generation server 8 via the communication network. In the probe data, the input host vehicle position, the periphery information indicating the periphery of host vehicle, and corresponding time are associated with one another. The DCM 2 transmits the probe data to the map generation server 8 via the communication network, for example, at a time when the travel distance of the host vehicle reaches a certain distance, or at a time when the elapsed period from last time transmission reaches a certain period, or the like.

When receiving the probe data transmitted from the vehicle system 1, the map generation server 8 integrates multiple records of probe data transmitted from multiple vehicles to generate a probe data map. For example, every time the map generation server 8 receives the probe data transmitted from the vehicle system 1, the map generation server 8 sequentially updates the probe data map by sequentially reflecting the feature information included in the received probe data in the latest probe data map.

When a transmission condition of the probe data map is satisfied, the map generation server 8 transmits the latest probe data map to the vehicle system 1. The map generation server 8 manages, for example, the probe data map in units of segments corresponding to sections. When the map generation server 8 receives the host vehicle position transmitted from the vehicle system 1, the map generation server 8 specifies the probe data map of the segment corresponding to the received host vehicle position, and transmits, via the communication network, the specified probe data map to the vehicle system 1, which is the transmission source of the host vehicle position.

In the DCM 2, when the probe data map acquiring unit 2a receives the probe data map transmitted from the map generation server 8, the probe data map acquiring unit 2a outputs the received probe data map to the attention point specifying unit 4c and the map quality determination unit 4e.

When the map quality determination unit 4e receives the periphery information indicating the periphery of host vehicle from the vehicle periphery recognition unit 4b and receives the probe data map from the DCM 2, the map quality determination unit 4e collates the probe data map with the periphery information indicating the periphery of host vehicle and determines a quality of the probe data map. For example, the map quality determination unit 4e determines whether the feature information indicated by the probe data map matches the periphery information around the host vehicle indicated by the detection result of the autonomous sensor, and determines the quality of probe data map based on the determination result. Specifically, the map quality determination unit 4e determines whether the position and the type of feature indicated by the probe data map match the position and the type of feature included in the periphery information around the host vehicle indicated by the detection result of the autonomous sensor, and determines the quality of probe data map based on the determination result.

For example, the map quality determination unit 4e digitizes a matching degree between the feature information indicated by the probe data map and the periphery information around the host vehicle indicated by the detection result of the autonomous sensor, and compares the digitized numerical value with a predetermined threshold. The map quality determination unit 4e determines that the probe data map has high quality when a difference between the feature information indicated by the probe data map and the periphery information around the host vehicle indicated by the detection result of the autonomous sensor is small and the numerical value indicating the matching degree is equal to or greater than the predetermined threshold value. When the map quality determination unit 4e determines that the probe data map has high quality, the map quality determination unit 4e outputs the probe data map determined to have high quality to the attention point specifying unit 4c. When the map quality determination unit 4e determines that the difference between the feature information indicated by the probe data map and the periphery information around the host vehicle indicated by the detection result of the autonomous sensor is large and the numerical value indicating the matching degree is less than the predetermined threshold value, the map quality determination unit 4e determines that the probe data map has low quality.

An external array microphone 16 outputs, to the attention point specifying unit 4C, audio information obtained by collecting sounds around the host vehicle. The external array microphone 16 also corresponds to an autonomous sensor similarly to the millimeter wave radar 12, the sonar 13, the LiDAR 14, and the camera 15 described above. When the probe data map is input from the map quality determination unit 4e, the attention point specifying unit 4c specifies an attention point and outputs the specifying result to the safety confirmation determination unit 4f. The attention point is a point where the driver needs to check about safety during driving. For example, the attention point may be a blind spot of an intersection or the like. When sound information is input from the external array microphone 16, the attention point specifying unit 4c specifies an attention point with reference to the input sound information. When the probe data map is not input from the map quality determination unit 4e, the attention point specifying unit 4c specifies the attention point using the detection result of the autonomous sensor, and outputs the specification result to the safety confirmation determination unit 4f.

A driver status monitor (DSM, registered trademark) 17 that monitors a status of the driver captures a face image of the driver using a driver monitor camera, determines a face direction, a line-of-sight direction, head swing, and the like from the face image of the driver, and outputs the determination result to the driver status recognition unit 4d.

When the determination result is input from the DSM 17, the driver status recognition unit 4d recognizes the driver status using the determination result, and outputs driver status information indicating the recognized driver status to the DCM 2, the safety confirmation determination unit 4f, and the driving participate execution unit 4g.

When the safety confirmation determination unit 4f receives the periphery information indicating the periphery of host vehicle from the vehicle periphery recognition unit 4b and receives the driver status information from the driver status recognition unit 4d, the safety confirmation determination unit 4f determines whether to activate an alert with reference to the received periphery information indicating the periphery of the host vehicle and the driver status information. The safety confirmation determination unit 4f determines whether the line of sight of the driver is directed in a direction of the attention point when the attention point occurs, determines whether the driver performs the safety confirmation based on the driver status, and determines whether it is necessary to activate the alert.

When it is determined that the line of sight direction of the driver is directed to the attention point, the safety confirmation determination unit 4f determines that activation of alert is not necessary. When it is determined that the line of sight direction of the driver is not directed to the attention point, the safety confirmation determination unit 4f determines that it is necessary to activate an alert, and outputs a notification instruction to the notification control unit 5a. When the notification control unit 5a receives the notification instruction from the safety confirmation determination unit 4f, the notification control unit 5a outputs an activation instruction to a head-up display (hereinafter referred to as HUD) 18, a speaker 19, and an ambient light 20, and outputs the notification instruction to the body ECU 6. The notification control unit 5a outputs an alert at a position close to the line of sight of the driver in the HUD 18, the speaker 19, the ambient light 20, and a side electronic mirror 21, and notifies the driver of safety confirmation non-execution information indicating that the driver has not yet performed the safety confirmation.

For example, the alert may be a message, an icon that prompts safety confirmation for the attention point. For example, when the line of sight of the driver is directed forward in the traveling direction of the host vehicle, the notification control unit 5a displays a message, an icon, or the like in front of the driver on the HUD 18. For example, when the line of sight of the driver is directed right forward in the traveling direction of the host vehicle, the notification control unit 5a displays, on the HUD 18, a message, an icon, or the like on the right forward portion of the driver. For example, when the line of sight of the driver is directed left forward in the traveling direction of the host vehicle, the notification control unit 5a displays, on the HUD 18, a message, an icon, or the like on the left forward portion of the driver. In addition, the notification control unit 5a may control the speaker 19 to output, for example, a sound of a message for prompting performing of the safety confirmation for the attention point. By outputting the alert in the above-described manner, it is possible to make the driver aware that attention should be made to the attention point without distraction.

In the DCM 2, when the safety confirmation determination unit 4f determines that the line of sight of the driver is directed toward the attention point and thus activation of alert is not necessary, a first driving data transmission unit 2b transmits the driver's driving data to the driving data management server 9 via the communication network in order to perform point grant to the driver for the line of sight of the driver being directed toward the attention point, that is, the driver performing the safety confirmation. The driver's driving data includes driver information capable of specifying the driver, and information indicating the behavior of host vehicle, such as traveling position, accelerator operation, brake operation, steering operation, and vehicle speed of host vehicle.

When the driving data management server 9 receives the driver's driving data transmitted from the vehicle system 1, the driving data management server 9 transmits the received driver's driving data to the cooperation service server 10. Upon receiving the driver's driving data transmitted from the driving data management server 9, the cooperation service server 10 performs driving diagnosis using the received driver's driving data, and performs point grant to the driver corresponding to the driving diagnosis result of the driver. The cooperation service server 10 may assign a certain number of points regardless of the driving diagnosis result, or may assign a different number of points depending on a level of the driving diagnosis result. When the point grant is performed in association with the driver as described above, the cooperation service server 10 transmits, to the driving data management server 9, point data for notifying the driver about point grant.

When the driving data management server 9 receives the point data transmitted from the cooperation service server 10, the driving data management server 9 transmits the received point data to the DCM 2. When the DCM 2 receives the point data transmitted from the driving data management server 9, the DCM 2 outputs the received point data to the safety confirmation determination unit 4f. When the point data is input from the DCM 2, the safety confirmation determination unit 4f outputs a notification instruction to the notification control unit 5a.

When the notification control unit 5a receives the notification instruction from the safety confirmation determination unit 4f, the notification control unit 5a outputs an activation instruction to the HUD 18, the speaker 19, and the ambient light 20, and notifies point grant information indicating the point grant. The notification control unit 5a notifies the driver of safety confirmation execution information indicating execution state of safety confirmation by the driver. The point grant information is, for example, a message, an icon, or the like for notifying the driver that the points have been granted. The notification control unit 5a controls, for example, the HUD 18 to display the message, the icon, or the like indicating the point grant information. The notification control unit 5a may control the speaker 19 to output a sound effect expressing dropping of a coin, such as clanging sound, or a message indicating the point grant. By notifying the point grant information in this way, it is possible to make the driver recognize that the point has been granted by performing the safety confirmation about the attention point. Thus, it is possible to make the driver conscious of continuing the safety confirmation about the attention point.

A sensor group 23 connected to an airbag 22 includes, for example, a vehicle speed sensor detecting a vehicle speed, an acceleration sensor detecting an acceleration of the vehicle, and a yaw rate sensor detecting a yaw rate of the vehicle. The sensor group outputs the detection results to the driving participate execution unit 4g. The sensor group 23 may be connected to the ADAS domain ECU 4 or the central ECU 3.

When the driving participate execution unit 4g receives the periphery information indicating the periphery of host vehicle from the vehicle periphery recognition unit 4b, receives the driver status information from the driver status recognition unit 4d, and receives the detection results from the sensor group 23 connected to the airbag 22, the driving participate execution unit 4g determines whether it is necessary to participate in the driving operation, which is being executed by the driver, with reference to the periphery information indicating the periphery of host vehicle, the driver status information, and the detection result, which are input from the various sources. For example, the driving participate execution unit 4g determines whether the line of sight of the driver is directed to the traveling direction of the host vehicle, determines whether the traveling direction of the host vehicle is dangerous, determines whether the speed, the acceleration, and the yaw rate of host vehicle are normal, and the like. Then, the driving participate execution unit 4g determines whether it is necessary to participate in the driving operation being performed by the driver.

For example, the driving participate execution unit 4g may determine that there is no need to participate in the driving operation being performed by the driver, when it is determined that (i) the line of sight of the driver is directed to the traveling direction of the host vehicle, (ii) the traveling direction of the host vehicle is not dangerous, (iii) the speed, the acceleration, and the yaw rate of the host vehicle are normal, or (iv) the driving operation is properly performed by the driver. For example, the driving participate execution unit 4g may determine that it is necessary to participate in the driving operation being performed by the driver, when it is determined that (i) the line of sight of the driver is not directed to the traveling direction of the host vehicle, (ii) the traveling direction of the host vehicle is dangerous, (iii) the speed, the acceleration, and the yaw rate of the host vehicle are not normal, or (iv) the driving operation not properly performed by the driver. When determining that it is necessary to participate in the driving operation being performed by the driver, the driving participate execution unit 4g outputs a driving participate instruction to the powertrain domain ECU 7.

When the driving participate instruction is input from the driving participate execution unit 4g, the powertrain domain ECU 7 outputs the driving participate instruction to a brake device 24. For example, a sensor group 25 connected to the brake device 24 may include a vehicle speed sensor detecting a speed of the host vehicle, an acceleration sensor detecting an acceleration of the host vehicle, and a yaw rate sensor detecting a yaw rate of the host vehicle. The sensor group 25 outputs the detection results to the brake device 24. The sensor group 25 may be connected to the powertrain domain ECU 7 or the central ECU 3. When receiving the driving participate instruction from the powertrain domain ECU 7, the brake device 24 performs a collision damage reduction brake (hereinafter, referred to as Autonomous Emergency Braking (AEB)) control using, for example, detection results of the sensor group 25. In addition to the AEB control, steering control, attitude control, or the like may be performed as the participation in the driving operation. For example, electronic stability control (ESC) may be performed as the participation in the driving operation.

In the DCM 2, in response to determining that (i) the line of sight of the driver is directed to the traveling direction of the host vehicle, (ii) the traveling direction of the host vehicle is not dangerous, (iii) the speed, the acceleration, and the yaw rate of the host vehicle are normal, the driving participate execution unit determines that there is no need to participate in the driving operation being performed by the driver. In this case, the second driving data transmission unit 2c transmits the driver's driving data to the driving data management server 9 via the communication network in order to perform point grant since there is no need to participate in the driving operation being performed by the driver, that is, safe driving is continuously performed even after the driver performs safety confirmation. For the driver's driving data transmitted from the second driving data transmission unit 2c, the driving data management server 9 and the cooperation service server 10 perform the same process as when the first driving data transmission unit 2b transmits the driver's driving data described above, and perform point grant to the driver.

As described above, the point grant information is notified by the vehicle system 1 when the driver is performing the driving operation. Alternatively, the driving diagnosis result may be notified to the driver by the vehicle system 1 when the driver finishes the driving operation. For example, an address of a portable information terminal of the driver, such as a smartphone may be registered in advance. The driving diagnosis result may be transmitted from the driving data management server 9 to the registered portable information terminal of the driver via the communication network when the driver finishes the driving operation, and the driving diagnosis result may be notified to the driver by the portable information terminal.

The following will describe a detailed operation of the above-described configuration with reference to FIG. 3 to FIG. 8. The vehicle system 1 executes a probe data transmission process and a driving diagnosis process, which will be described in detail. The vehicle system 1 performs the probe data transmission process by executing a probe data transmission program, and performs the driving diagnosis process by executing a driving diagnosis program.

Figure 3:
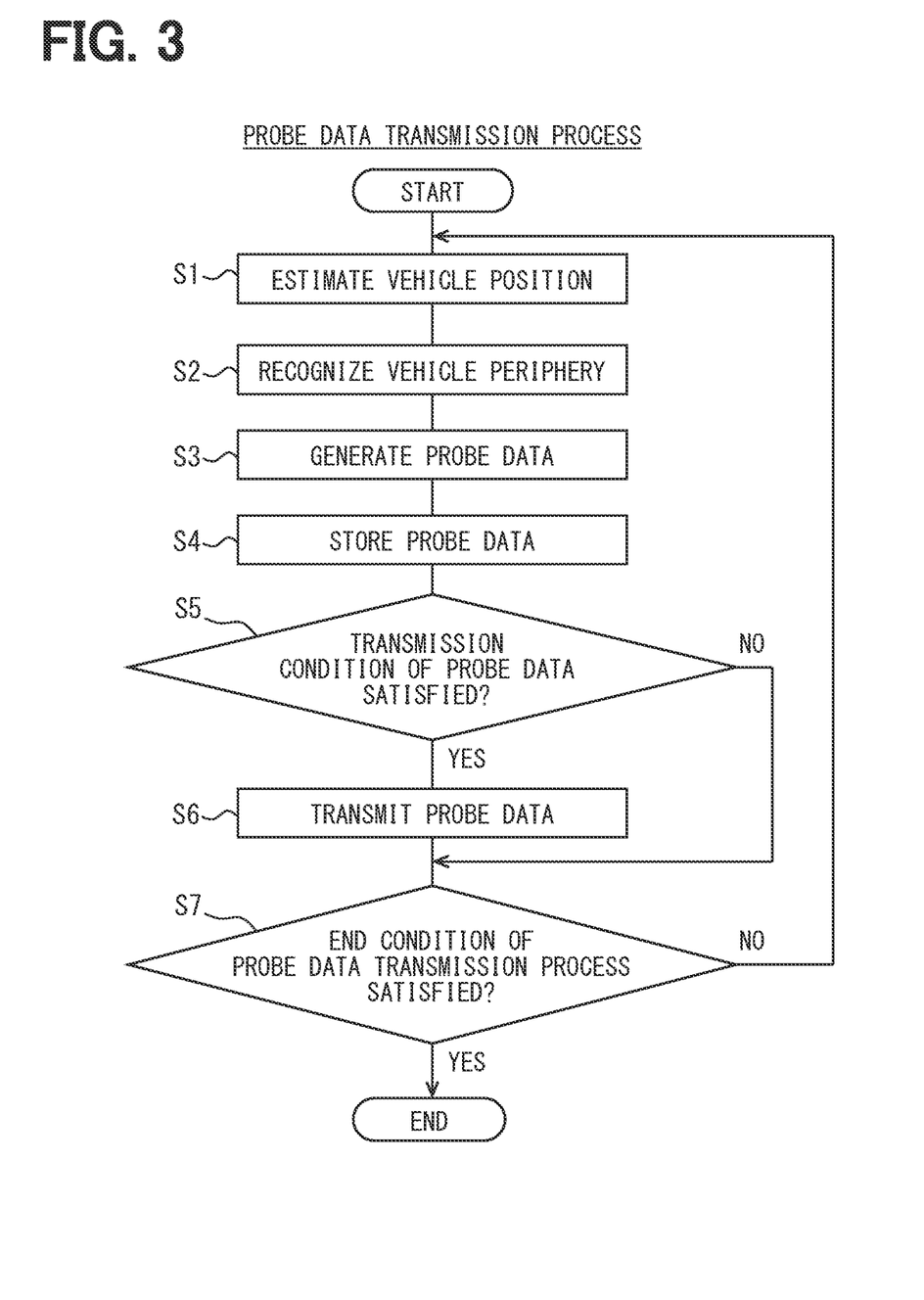
FIG. 3 is a flowchart showing a probe data transmission process.

(1) Probe Data Transmission Process (see FIG. 3)

The vehicle system 1 starts the probe data transmission process when a start condition of the probe data transmission process is satisfied, for example, an ignition switch of the vehicle is turned on. When the probe data transmission process is started, the vehicle system 1 estimates, in S1, the host vehicle position by the vehicle position estimation unit 4a using the position coordinates input from the locator 11. The vehicle system 1 recognizes, in S2, the periphery of host vehicle by the vehicle periphery recognition unit 4b using the detection result input from the millimeter wave radar 12, the detection result input from the sonar 13, the detection result input from the LiDAR 14, and the camera image input from the camera 15. The vehicle system 1 generates, in S3, probe data by associating (i) the host vehicle position estimated by the vehicle position estimation unit 4a, (ii) the periphery information indicating periphery of the host vehicle recognized by the vehicle periphery recognition unit 4b, and (iii) the time information with one another, and stores the generated probe data in the data storage area in S4.

The vehicle system 1 determines whether a transmission condition of the probe data is satisfied in S5. For example, when the travel distance of host vehicle reaches a certain distance or when an elapsed period from last satisfaction of transmission condition reaches a certain period or the like, the process determines that the transmission condition of the probe data is satisfied (S5: YES). In response to satisfaction of the transmission condition, the vehicle system 1 transmits the probe data stored in the data storage area from the DCM 2 to the map generation server 8 via the communication network in S6.

The vehicle system 1 determines whether an end condition of the probe data transmission process is satisfied in S7. For example, when the ignition is turned off, the end condition may be determined to be satisfied. In response to determining that the end condition of probe data transmission process being not satisfied in turn-on state of the ignition switch (S7: NO), the vehicle system 1 returns to S1 and repeats S1 and subsequent process as described above. When the vehicle system 1 determines that the end condition of probe data transmission process is satisfied in response to the ignition being turned off (S7: YES), the vehicle system 1 ends the probe data transmission process.

Figure 4:
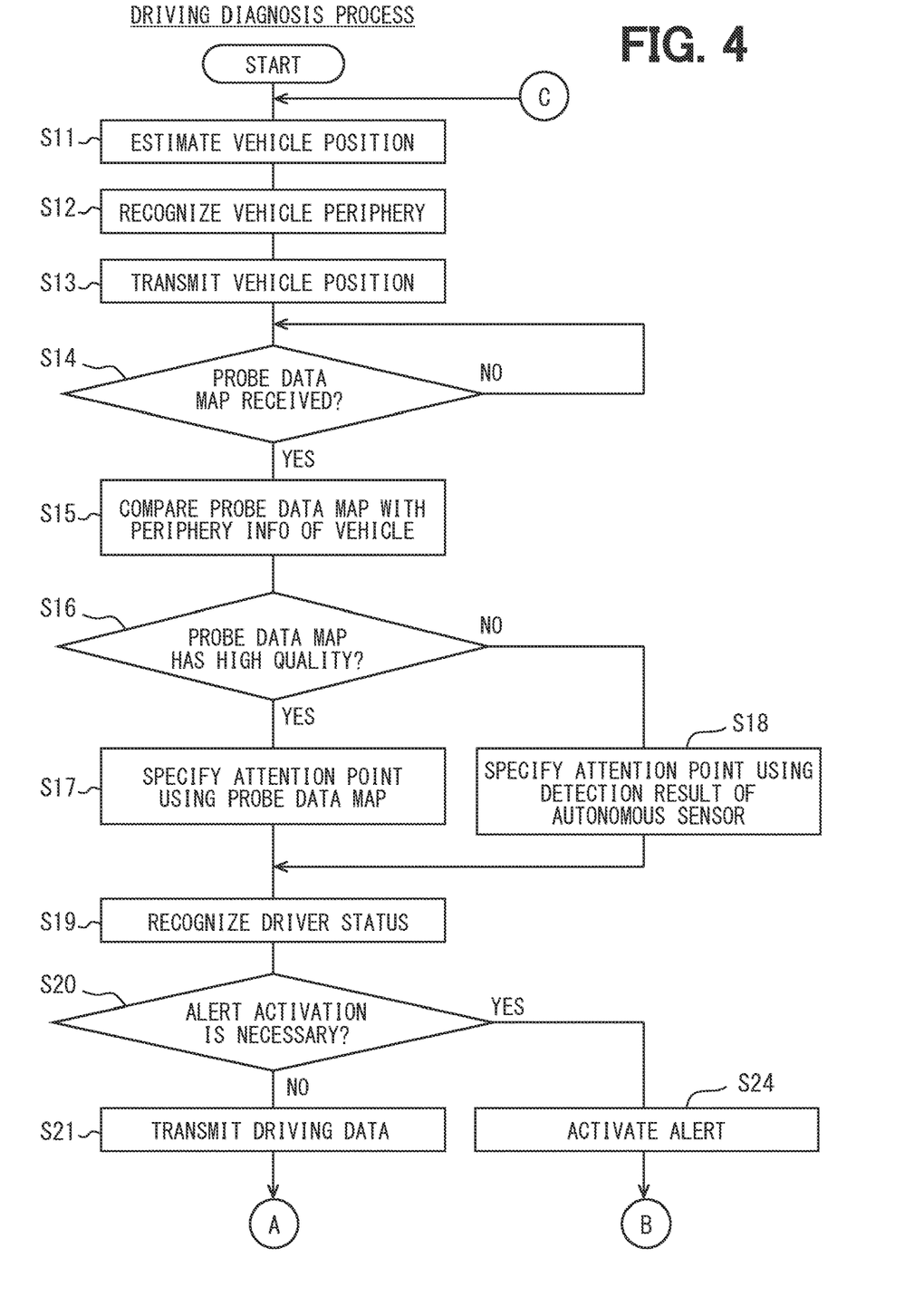
FIG. 4 is a flowchart showing a driving diagnosis process.
Figure 5:
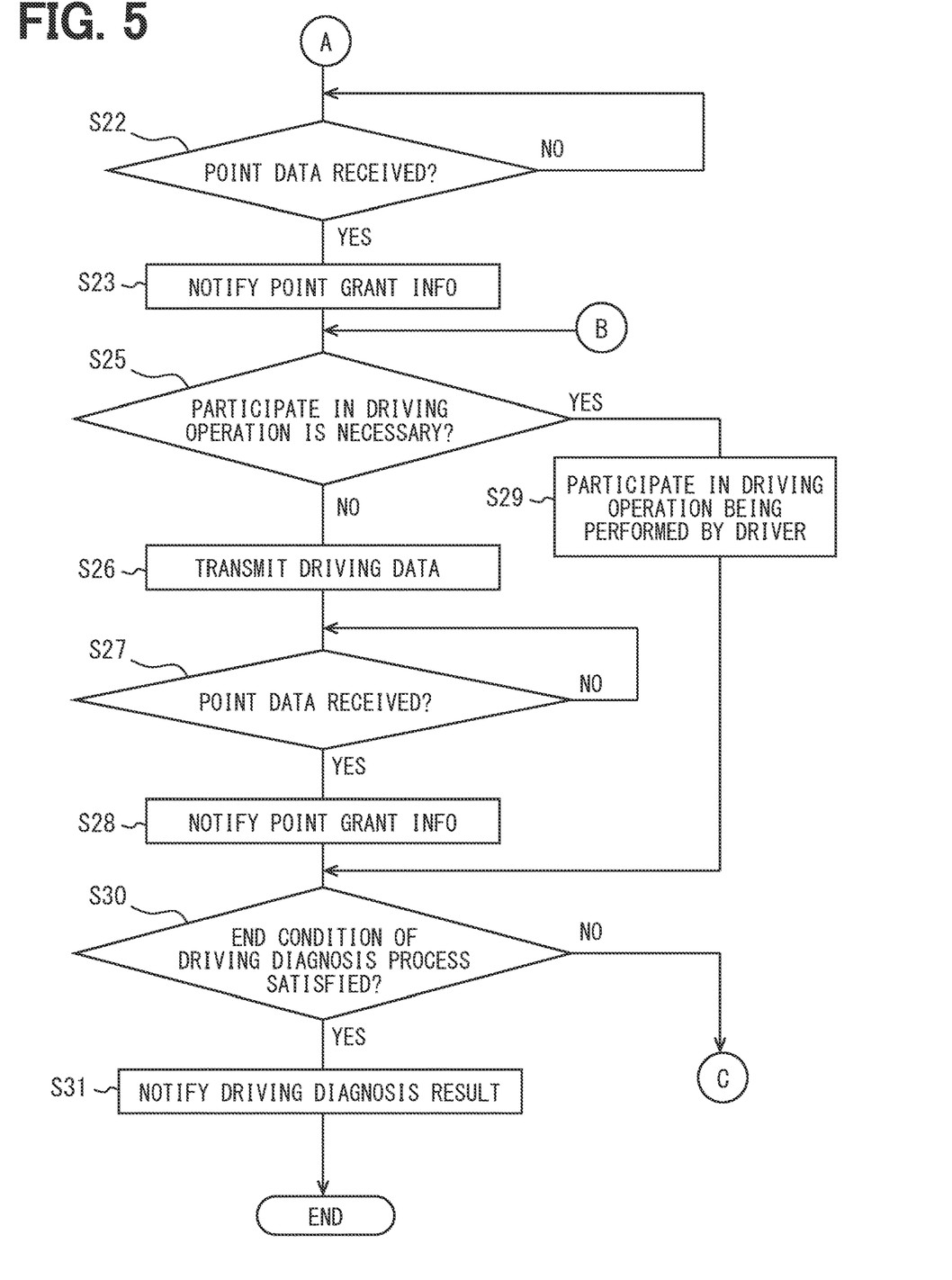
FIG. 5 is a flowchart showing a driving diagnosis process.

(2) Driving Diagnosis Process (See FIG. 4 and FIG. 5)

The vehicle system 1 may start the driving diagnosis process when a start condition of the driving diagnosis process is satisfied in response to turning on of the ignition switch. When the vehicle system 1 starts the driving diagnosis process, the vehicle system 1 estimates, in S11, the host vehicle position by the vehicle position estimation unit 4a using the position coordinates input from the locator 11 (corresponding to a host vehicle position estimation step). The vehicle system 1 recognizes, in S12, the periphery of host vehicle by the vehicle periphery recognition unit 4b using the detection result input from the millimeter wave radar 12, the detection result input from the sonar 13, the detection result input from the LiDAR 14, and the camera image input from the camera 15.

The vehicle system 1 transmits, in S13, the host vehicle position estimated by the vehicle position estimation unit 4a from the DCM 2 to the map generation server 8 via the communication network, and waits for reception of the probe data map from the map generation server 8 in S14. When the map generation server 8 receives the vehicle position transmitted from the vehicle system 1, the map generation server 8 specifies the probe data map of the segment corresponding to the received vehicle position, and transmits, via the communication network, the specified probe data map to the vehicle system 1 which is the transmission source of the vehicle position. In the driving diagnosis process, instead of S11 to S13, S1 to S6 of the probe data transmission process may be executed. That is, the vehicle system 1 may transmit the host vehicle position by transmitting the probe data. When the map generation server 8 receives the probe data transmitted from the vehicle system 1, the map generation server 8 may specify the host vehicle position based on the received probe data, specify the probe data map of the segment corresponding to the specified host vehicle position, and transmit, via the communication network, the specified probe data map to the vehicle system 1 which is the transmission source of the host vehicle position.

When the vehicle system 1 determines that the DCM 2 has received the probe data map transmitted from the map generation server 8 (S14: YES, corresponding to a probe data map acquisition step), the vehicle system 1 compares the received probe data map with the periphery information indicating the periphery of host vehicle in S15, and determines a quality of the probe data map by the map quality determination unit 4e in S16. When the vehicle system 1 determines that a difference between the feature information indicated by the probe data map and the periphery information indicating the periphery of host vehicle and acquired based on the detection result of the autonomous sensor is small, that is the probe data map has high quality (S16: YES), the vehicle system 1 specifies the attention point using the probe data map determined to have high quality in S17.

When the vehicle system 1 determines that a difference between the feature information indicated by the probe data map and the periphery information indicating the periphery of host vehicle and acquired based on the detection result of the autonomous sensor is large, that is the probe data map has low quality (S16: NO), the vehicle system 1 specifies the attention point using the detection results of autonomous sensor in S18 (corresponding to attention point specifying step).

In the vehicle system 1, based on the input determination result of face image of the driver captured by the driver monitor camera, the driver status recognition unit 4d recognizes the driver status in S19 (corresponding to a driver status recognition step). In the vehicle system 1, the safety confirmation determination unit 4f determines whether the line of sight of the driver is directed to an attention point when there exists an attention point, determines whether the driver performs the safety confirmation based on the driver status, and determines whether it is necessary to output the alert in S20 (corresponding to a safety confirmation determination step).

When the vehicle system 1 determines that the line of sight of the driver is directed to the attention point and thus determines that there is no need to output an alert (S20: NO), the vehicle system 1 transmits, in S21, the driver's driving data from the DCM 2 to the driving data management server 9 via the communication network for granting point to the driver who has properly performed the safety confirmation, and waits for reception of point data from the driving data management server 9 in S22.

When the driving data management server 9 receives the driver's driving data transmitted from the vehicle system 1, the driving data management server 9 transmits the received driver's driving data to the cooperation service server 10. When the driver's driving data transmitted from the driving data management server 9 is received, the cooperation service server 10 performs driving diagnosis using the received driver's driving data, assigns points corresponding to the driving diagnosis result in association with the driver, and transmits the point data for notifying the driver about the point grant to the driving data management server 9. When the driving data management server 9 receives the point data transmitted from the cooperation service server 10, the driving data management server 9 transmits the received point data to the vehicle system 1.

When the vehicle system 1 determines that the DCM 2 has received the point data transmitted from the driving data management server 9 (S22: YES), the vehicle system 1 activates the HUD 18, the speaker 19, the ambient light 20, and the like, and controls the notification control unit 5a to notify point grant information indicating that points have been granted in S23 (corresponding to a notification control step).

Figure 6:
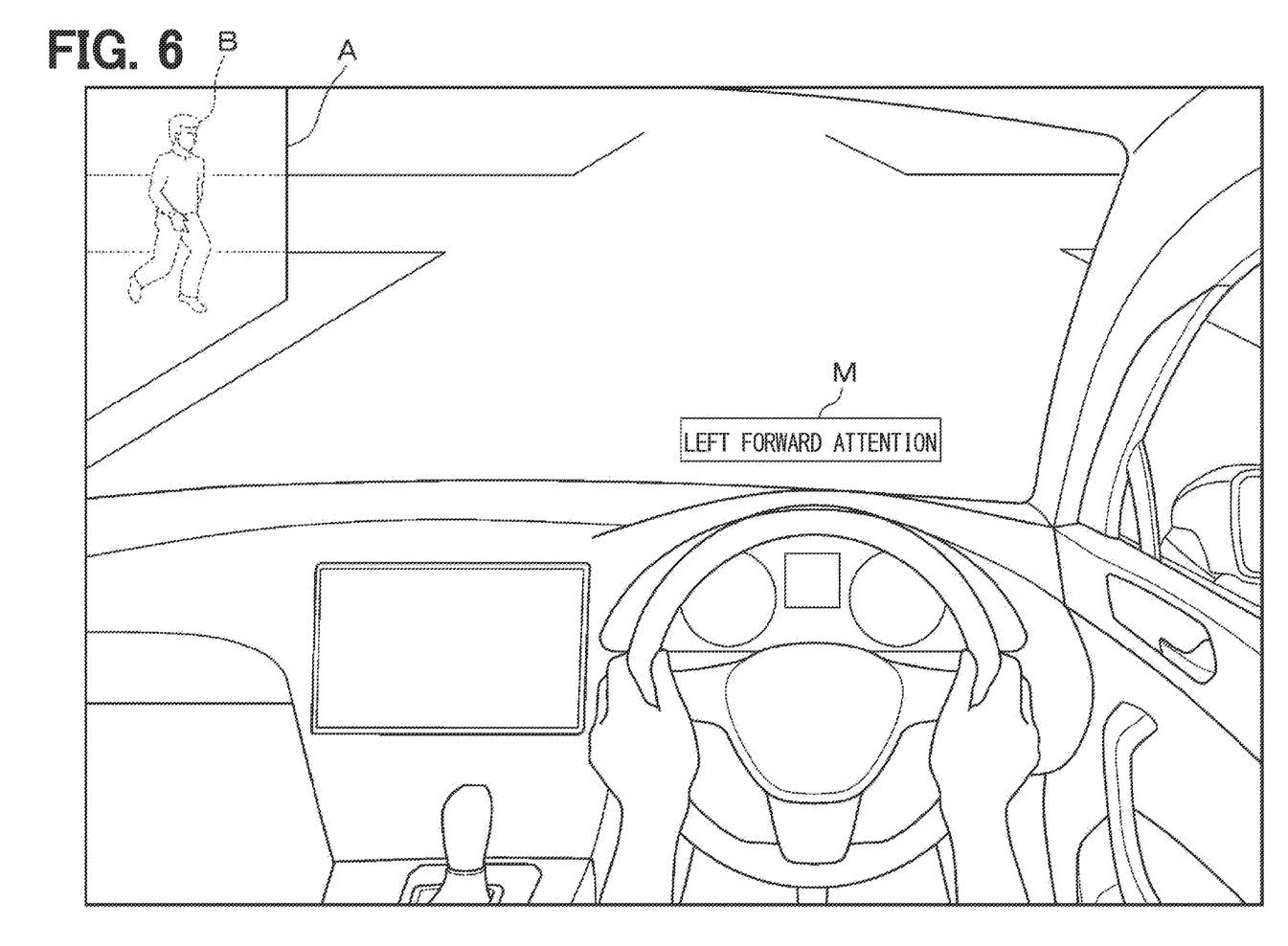
FIG. 6 is a diagram showing a mode in which driving attention information is displayed in the vehicle system.

When the vehicle system 1 determines that the line of sight of the driver is not directed to the attention point and determines that it is necessary to activate an alert (S20: YES), the vehicle system 1 activates the HUD 18, the speaker 19, the ambient light 20, and the like, and controls the notification control unit 5a to output an alert at a portion close to the line of sight of the driver in S24 (corresponding to a notification control step). As shown in FIG. 6, for example, when the vehicle system determines that there is a possibility that a pedestrian B jumps out from a shadow of building A in the left front direction of the host vehicle, the left front area of the host vehicle is specified as the attention point. In this case, when the line of sight of the driver is not directed to the left front direction of the host vehicle, the vehicle system 1 determines that it is necessary to activate the alert. For example, when the vehicle system 1 determines that the line of sight of the driver is in exactly forward direction along the traveling direction of host vehicle, the vehicle system 1 controls the HUD 18 to display a message M such as "Left forward attention" in front of the driver. The alert may be output in various manners under the condition that the driver can recognize the activated alert.

After the point grant information is notified by the notification control unit 5a, the vehicle system 1 receives the periphery information indicating periphery of the host vehicle, receives the driver status information, receives the detection result from the sensor group 23 connected to the airbag 22, and the driving participate execution unit 4g determines whether it is necessary to participate in the driving operation, which is being performed by the driver in S25. For example, when (i) the line of sight of the driver is directed to the traveling direction of the host vehicle, (ii) the traveling direction of the host vehicle is not dangerous, and (iii) the speed, the acceleration, and the yaw rate of the host vehicle are normal, the vehicle system 1 determines that it is not necessary to participate in the driving operation of the driver (S25: NO). Then, the vehicle system 1 transmits, in S26, the driver's driving data from the DCM 2 to the driving data management server 9 via the communication network in order to perform point grant to the driver who continues safe driving even after the safety confirmation is made. Then, the vehicle system 1 waits for reception of the point data from the driving data management server 9 in S27.

When the driving data management server 9 receives the driver's driving data transmitted from the vehicle system 1, the driving data management server 9 transmits the received driver's driving data to the cooperation service server 10. Upon receiving the driver's driving data transmitted from the driving data management server 9, the cooperation service server 10 evaluates a degree of safe driving as a driving diagnosis using the received driver's driving data, performs point grant to the driver corresponding to the driving diagnosis result. Then, the cooperation service server 10 transmits point data for notifying the driver that the points have been granted to the driving data management server 9. When the driving data management server 9 receives the point data transmitted from the cooperation service server 10, the driving data management server 9 transmits the received point data to the vehicle system 1.

When the vehicle system 1 determines that the DCM 2 has received the point data transmitted from the driving data management server 9 (S27: YES), the vehicle system 1 activates the HUD 18, the speaker 19, the ambient light 20, and the like, and controls the notification control unit 5a to notify point grant information indicating that points have been granted in S28.

The vehicle system 1 determines that it is necessary to participate in the driving operation being performed by the driver, when at least one of (i), (ii), or (iii) is determined. (i) The line of sight of the driver is not directed to the traveling direction of the host vehicle. (ii) The traveling direction of the host vehicle is dangerous. (iii) The speed, the acceleration, and the yaw rate of the host vehicle are not normal. When determining that it is necessary to participate in the driving operation being performed by the driver (S25: YES), the powertrain domain ECU 7 may perform the ABS control as the participation in the driving operation, which is being performed by the driver, in S29.

Figure 7:
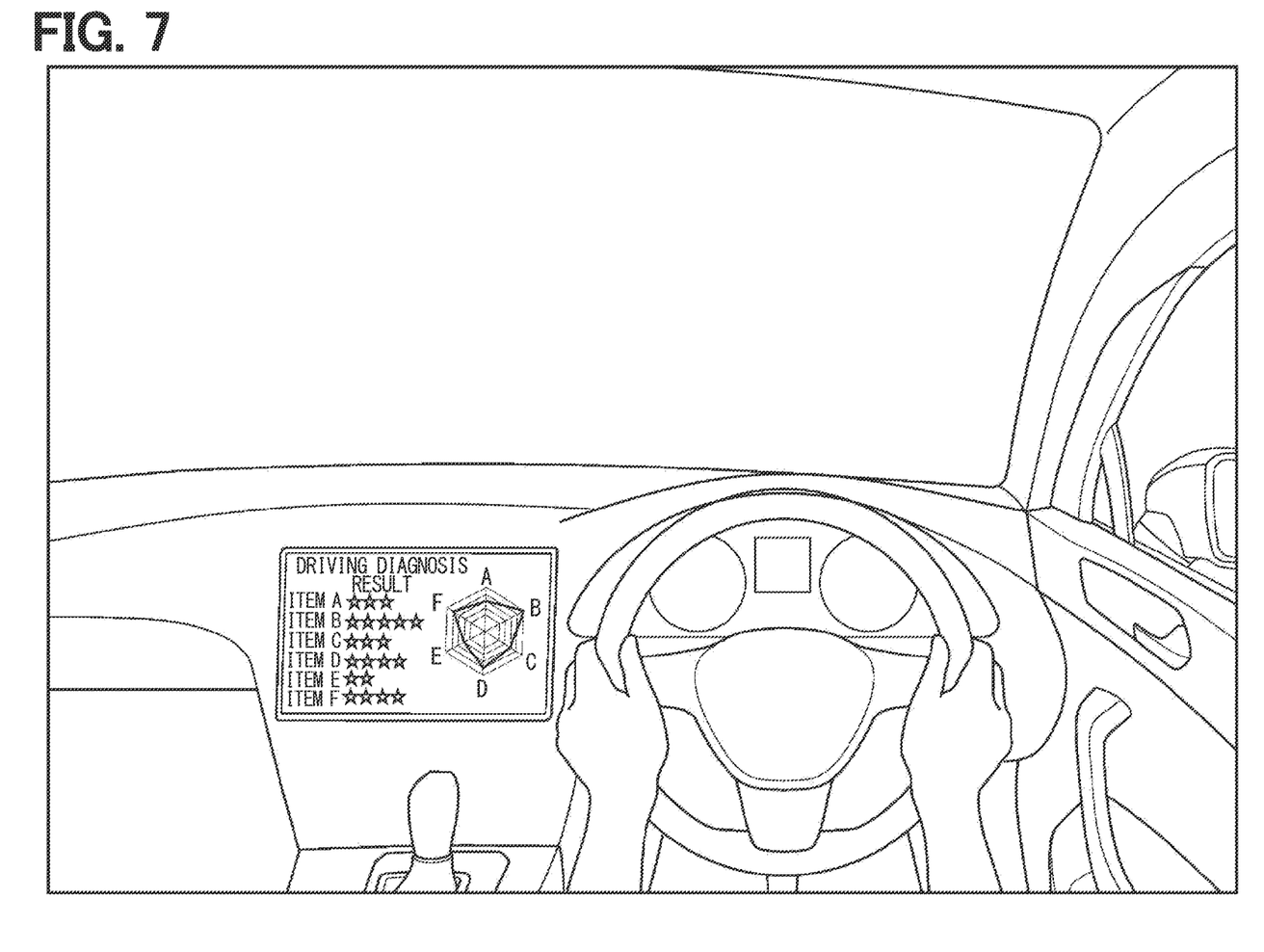
FIG. 7 is a diagram showing a mode in which a driving diagnosis result is displayed in the vehicle system.

The vehicle system 1 determines whether the end condition of driving diagnosis process is satisfied by, for example, determining whether the ignition switch is turned off or not in S30. When the vehicle system 1 determines that the end condition of driving diagnosis process is not satisfied since the ignition switch maintains on state (S30: NO), the vehicle system 1 returns to S11 and repeats S11 and subsequent process as described above. When the vehicle system 1 determines that the end condition of driving diagnosis process is satisfied by turning off the ignition switch (S30: YES), the vehicle system 1 displays, for example, the driving diagnosis result on the center display, the meter display, or the like in S31, and ends the driving diagnosis process. As shown in FIG. 7, as an example, the vehicle system 1 may display, on a center display, a meter display, or the like, the driving diagnosis results of six items A to F performed by the driving data management server 9. Each of the six items A to F indicates one index indicating whether the driving operation of the driver is safe. For example, each item may evaluate a frequency of sudden acceleration, a frequency of sudden deceleration, a frequency of sudden steering, and the like in five levels.

Figure 8:
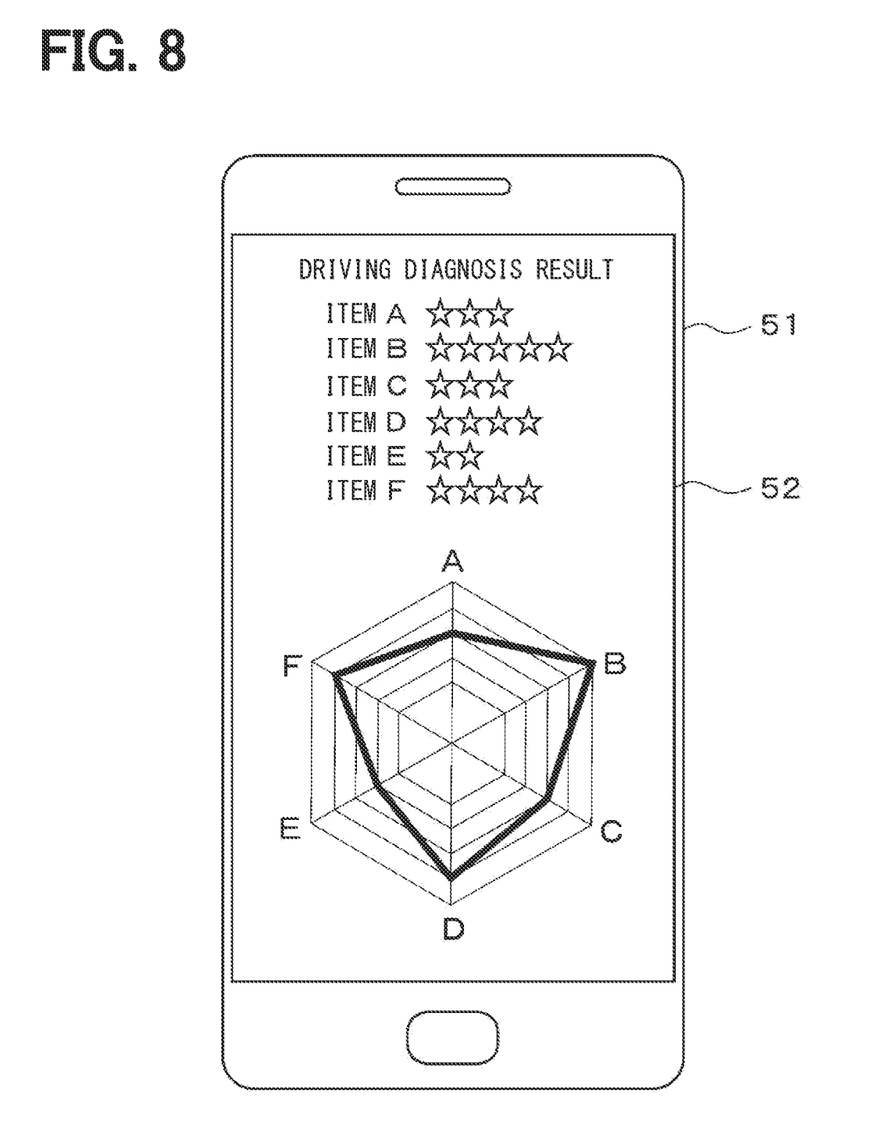
FIG. 8 is a diagram showing a mode in which a driving diagnosis result is displayed on a portable information terminal.

As shown in FIG. 8, upon receiving the driving diagnosis result transmitted from the driving data management server 9, the portable information terminal 51 of the driver may display the received driving diagnosis result on a display 52. Under a condition that the driver can recognize the driving diagnosis result, the driving diagnosis result may be displayed in different manners on the center display, the meter display, or the like of the vehicle system 1 and the driving diagnosis result displayed on the display 52 of the mobile information terminal 51.

The above-described embodiment can provide the following operational effects.

Unlike the related art in which driving diagnosis is performed only based on the behavior of host vehicle, in the vehicle system 1 according to the above-described embodiment of the present disclosure, the attention point is specified using the probe data map. Then, the vehicle system determines whether the driver performs safety confirmation about the attention point based on the driver status, and the determination result is notified to the driver. When the driver does not perform the safety confirmation about the attention point, the driver is notified of the necessity of safety confirmation so that the driver can perform the safety confirmation. When the driver performs the safety confirmation about the attention point, the driver is notified of the execution of safety confirmation so that a sense of safety and security from the vehicle can be appropriately notified to the driver.

When the probe data map is determined to have high quality by comparing the feature information indicated by the probe data map with the periphery information indicating the periphery of host vehicle acquired from the detection result of autonomous sensor, the vehicle system determines whether the driver performs safety confirmation for the attention point indicated by the probe data map, which is determined to have high quality, based on the driver status. Thus, it is possible to increase the specifying accuracy of attention point using the high reliability probe data map, and determine whether the driver has performed the safety confirmation on the specified attention point in the high reliability probe data map.

When the probe data map is determined to have low quality, instead of determining whether the driver has performed the safety confirmation for the attention point indicated by the probe data map having low quality, the vehicle system according to the present disclosure determines whether the driver has performed the safety confirmation, based on the driver status, for the attention point indicated by the detection result of the autonomous sensor. When the probe data map has low reliability, it is possible to determine whether the driver has performed the safety confirmation for the attention point by specifying the attention point using the detection result of autonomous sensor.

When the safety confirmation is determined to be performed by the driver, the driver's driving data converted into the points serving as the privilege to the driver is transmitted to the driving data management server 9. Thus, it is possible to develop a point grant service in response to the driver performing the safety confirmation. The driver can receive the points by properly performing the safety confirmation.

When the driver properly continues the driving operation even after the safety confirmation, the driver's driving data converted into points serving as a privilege to the driver is transmitted to the driving data management server 9. Thus, it is possible to develop a point grant service for the fact that the driver is performing proper driving operation even after the driver has performed the safety confirmation. The driver can further earn points by performing proper driving after performing the safety confirmation.

After the safety confirmation, when the driving operation performed by the driver is determined to be not proper, the vehicle system participate in the driving operation, which is being performed by the driver. Thus, it is possible to appropriately cope with a situation in which the driver does not perform proper driving after performing the safety confirmation, for example, by performing ABS control or the like.

While the present disclosure has been described based on the above embodiments, the present disclosure is not limited to the embodiment or structure described herein. The present disclosure includes various modification examples and equivalents thereof. Additionally, various combinations and configurations, as well as other combinations and configurations including more, less, or only a single element, are within the scope and spirit of the present disclosure.

The control unit and the method thereof described in the present disclosure may be implemented by a dedicated computer provided by configuring a processor and a memory programmed to execute one or more functions embodied by a computer program. Alternatively, the control unit and the method thereof described in the present disclosure may be implemented by a dedicated computer provided by configuring a processor with one or more dedicated hardware logic circuits. Alternatively, the control unit and the method thereof described in the present disclosure may be implemented by one or more dedicated computers configured by a combination of a processor and a memory programmed to execute one or more functions and a processor configured with one or more hardware logic circuits. The computer program may be stored in a computer readable and non-transitory tangible storage medium as instructions to be executed by a computer.

What is claimed is:

1. A vehicle system comprising:
a vehicle position estimation unit estimating a position of a host vehicle;
a probe data map acquiring unit acquiring, from outside of the host vehicle, a probe data map generated based on probe data;
an autonomous sensor detecting periphery information indicating a periphery of the host vehicle;
a vehicle periphery recognition unit recognizing the periphery information indicating the periphery of the host vehicle using a detection result of the autonomous sensor;
an attention point specifying unit specifying an attention point using the probe data map;
a driver status recognition unit recognizing a status of a driver of the host vehicle;
a map quality determination unit comparing feature information indicated by the probe data map with the periphery information of the host vehicle indicated by the detection result of the autonomous sensor and determining whether the probe data map has a high quality or a low quality;
a safety confirmation determination unit determining, based on the status of the driver, whether the driver performs a safety confirmation for the attention point indicated by the probe data map when the probe data map is determined to have the high quality; and
a notification control unit notifying the driver of a determination result of the safety confirmation determination unit.

2. A vehicle system comprising:
a vehicle position estimation unit estimating a position of a host vehicle;
a probe data map acquiring unit acquiring, from outside of the host vehicle, a probe data map generated based on probe data;
an attention point specifying unit specifying an attention point using the probe data map;
a driver status recognition unit recognizing a status of a driver of the host vehicle;
a map quality determination unit determining whether the probe data map has a high quality or a low quality;
a safety confirmation determination unit determining, based on the status of the driver, whether the driver performs a safety confirmation for the attention point indicated by the probe data map when the probe data map is determined to have the high quality; and
a notification control unit notifying the driver of a determination result of the safety confirmation determination unit.

3. The vehicle system according to claim 2, further comprising:
an autonomous sensor detecting periphery information indicating a periphery of the host vehicle; and
a vehicle periphery recognition unit recognizing the periphery information indicating the periphery of the host vehicle using a detection result of the autonomous sensor,
wherein the map quality determination unit compares feature information indicated by the probe data map with the periphery information of the host vehicle indicated by the detection result of the autonomous sensor, and determines whether the probe data map has the high quality or the low quality.

4. The vehicle system according to claim 1, wherein, when the probe data map is determined to have the low quality, the safety confirmation determination unit does not determine whether the driver performs the safety confirmation for the attention point indicated by the probe data map, which is determined to have the low quality.

5. The vehicle system according to claim 4, wherein, when the probe data map is determined to have the low quality, the safety confirmation determination unit determines, based on the status of the driver, whether the driver performs the safety confirmation for the attention point indicated by the detection result of the autonomous sensor.

6. The vehicle system according to claim 1, wherein the attention point specifying unit specifies, as the attention point, a blind spot when viewed from the driver.

7. The vehicle system according to claim 1, wherein the notification control unit notifies the driver of execution information indicating an execution of the safety confirmation in response to determining that the driver performs the safety confirmation.

8. The vehicle system according to claim 1, further comprising
a first driving data transmission unit transmitting, to the outside of the host vehicle, driving data of the driver, which is converted into points serving as a privilege for the driver, in response to determining that the driver performs the safety confirmation.

9. The vehicle system according to claim 1, wherein the notification control unit notifies the driver of non-execution information indicating that the safety confirmation is not executed in response to determining that the driver does not perform the safety confirmation.

10. The vehicle system according to claim 9, wherein, as a notification of the non-execution information indicating that the safety confirmation is not executed, the notification control unit performs, at least one of (i) display of the non-execution information indicating that the safety confirmation is not executed at a portion close to a line of direction of the driver or (ii) output of an alert sound.

11. The vehicle system according to claim 1, further comprising
a second driving data transmission unit transmitting, to the outside of the host vehicle, driving data of the driver, which is converted into points serving as a privilege for the driver, in response to determining that the driver performs a proper driving operation after performing the safety confirmation.

12. The vehicle system according to claim 11, further comprising
a driving participate execution unit participating in the driving operation of the driver,
wherein the driving participate execution unit participates in the driving operation of the driver when the driving operation performed by the driver after the safety confirmation is determined to be not proper.

13. A computer-readable non-transitory storage medium storing a driving diagnosis program, the driving diagnosis program comprising instructions to be executed by at least one processor included in a vehicle system, the instructions comprising:
estimating a position of a host vehicle;
acquiring, from outside of the host vehicle, a probe data map generated based on probe data;
recognizing periphery information indicating a periphery of the host vehicle using a detection result of an autonomous sensor that detects the periphery information of the host vehicle;
specifying an attention point using the probe data map;
recognizing a status of a driver of the host vehicle;
comparing feature information indicated by the probe data map with the periphery information of the host vehicle indicated by the detection result of the autonomous sensor and determining whether the probe data map has a high quality or a low quality;
determining, based on the status of the driver, whether the driver performs a safety confirmation for the attention point indicated by the probe data map when the probe data map is determined to have the high quality; and
notifying the driver of a determination result indicating whether the driver has performed the safety confirmation.

14. A computer-readable non-transitory storage medium storing a driving diagnosis program, the driving diagnosis program comprising instructions to be executed by at least one processor included in a vehicle system, the instructions comprising:
estimating a position of a host vehicle;
acquiring, from outside of the host vehicle, a probe data map generated based on probe data;
specifying an attention point using the probe data map;
recognizing a status of a driver of the host vehicle;
determining whether the probe data map has a high quality or a low quality;
determining, based on the status of the driver, whether the driver performs a safety confirmation for the attention point indicated by the probe data map when the probe data map is determined to have the high quality; and
notifying the driver of a determination result indicating whether the driver has performed the safety confirmation.

* * * * *